United States Patent [19]

Sneddon

[11] Patent Number: 5,017,087
[45] Date of Patent: May 21, 1991

[54] MULTI-FUNCTIONAL ROTARY HYDRAULIC MACHINE SYSTEMS

[76] Inventor: John L. Sneddon, 18 Eilean Rise, Ellon, Aberdeenshire, Scotland, Great Britain, AB4 9NF

[21] Appl. No.: 314,646

[22] Filed: Feb. 22, 1989

Related U.S. Application Data

[63] Continuation-in-part of Ser. No. 57,684, May 26, 1987, abandoned, which is a continuation of Ser. No. 754,831, Jul. 12, 1985, abandoned.

[30] Foreign Application Priority Data

Jul. 13, 1984 [GB] United Kingdom ............... 8417929
Nov. 13, 1984 [GB] United Kingdom ............... 8428693

[51] Int. Cl.$^5$ .............................................. F04D 3/02
[52] U.S. Cl. ................................. 415/72; 415/221; 417/356
[58] Field of Search ................. 415/122.1, 124.1, 143, 415/71, 72, 73, 75, 214.1, 216.1, 220, 221, 912, 77, 91, 199.1, 92–122 A; 366/262, 266, 307, 302; 290/54, 43, 52; 417/356; 418/61.2, 48

[56] References Cited

U.S. PATENT DOCUMENTS

| | | | |
|---|---|---|---|
| 1,534,451 | 4/1925 | Kauter | 417/356 |
| 2,246,777 | 6/1941 | Bordeaux et al. | 415/143 |
| 2,633,290 | 3/1953 | Schaefer et al. | 415/73 |
| 2,693,313 | 11/1954 | McAdam | 417/356 |
| 2,736,264 | 2/1956 | Ehlers | 415/143 |
| 2,747,512 | 5/1956 | Fouche | 417/356 |
| 3,168,049 | 2/1965 | Taylor et al. | 418/48 |
| 3,263,619 | 8/1966 | Matelena | 417/356 |
| 3,273,506 | 9/1966 | Jamieson | 415/71 |
| 3,719,436 | 3/1973 | McFarlin | 417/356 |
| 3,779,521 | 12/1973 | Godines | 418/48 |
| 3,804,533 | 4/1974 | Hickey, Jr. | 416/177 |
| 3,822,972 | 7/1974 | Ogly et al. | 418/48 |
| 4,272,685 | 6/1981 | Toyama | 415/91 |
| 4,486,159 | 12/1984 | Garside | 418/61.2 |
| 4,863,357 | 9/1989 | Olofsson | 417/356 |

FOREIGN PATENT DOCUMENTS

7728/66 12/1967 Australia.
14712/70 11/1971 Australia.
33716/71 3/1973 Australia.

Primary Examiner—Edward K. Look
Assistant Examiner—Hoang Nguyen
Attorney, Agent, or Firm—Ratner & Prestia

[57] ABSTRACT

Multi-functional rotary hydraulic machines and machine systems combining a common rotary drive system with a family of mechanically interchangeable rotary hydraulic machine units having different hydraulic functions.

The machines have a static outer casing mounting a prime mover. The prime mover comprises a stator assembly and a rotor assembly. The stator assembly is mounted within and encased by the static outer casing. The rotor assembly comprises a pair of half-shafts by which the rotor assembly is rotatably mounted within the stator assembly. The rotor assembly further comprises mounting and coupling means by which a selected one of a plurality of mechanically interchangeable rotary hydraulic machine units is mounted within and coupled to the rotor assembly for rotation therewith. The rotary hydraulic machine units each have a different hydraulic function. Numerous different hydraulic machine units are described.

The machine system of the invention allows a hydraulic versatility not previously possible.

20 Claims, 14 Drawing Sheets

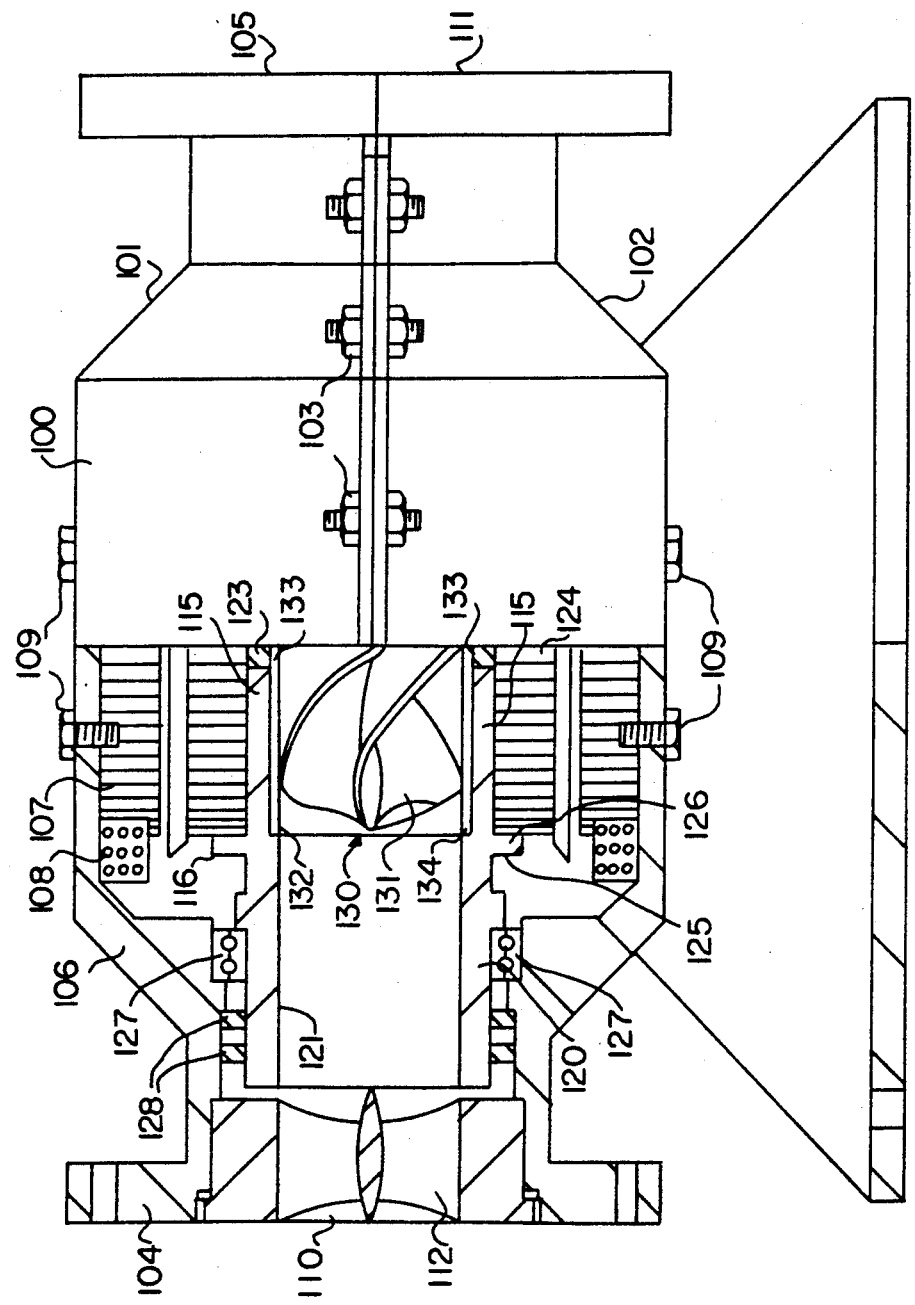

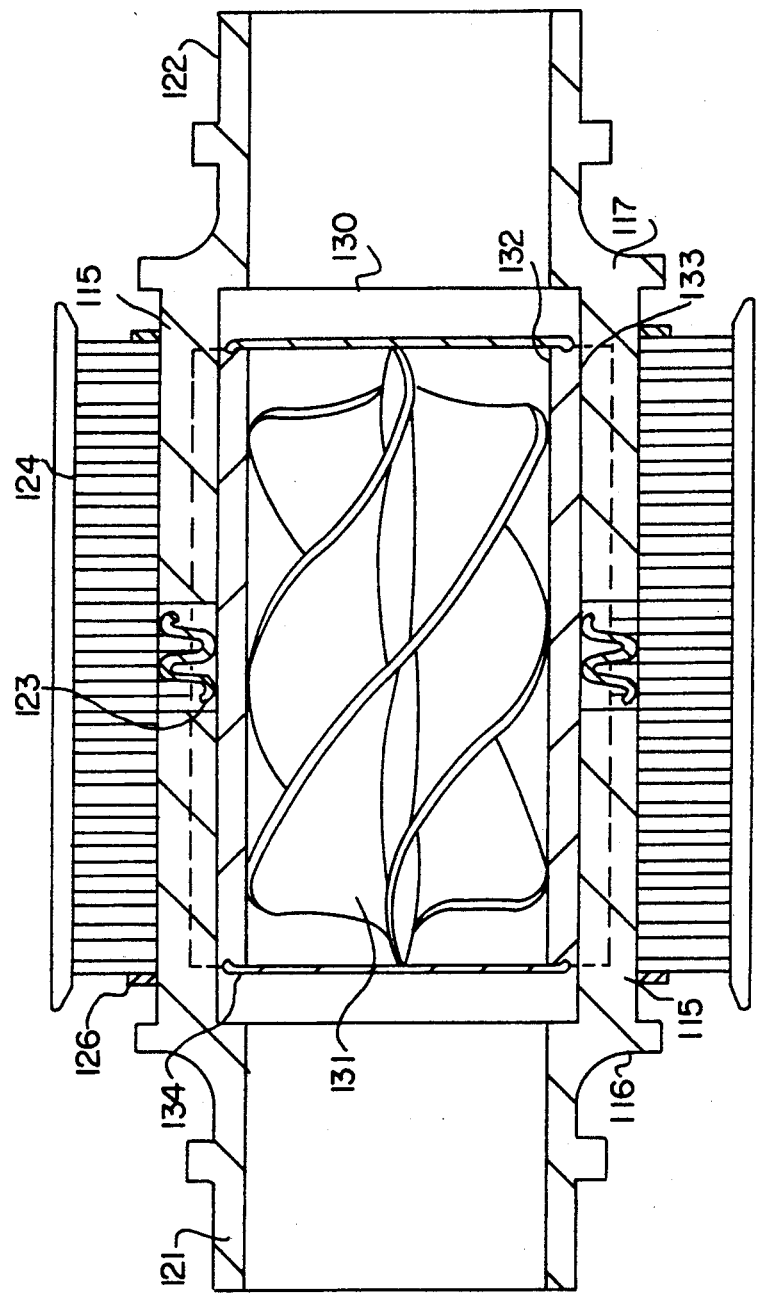

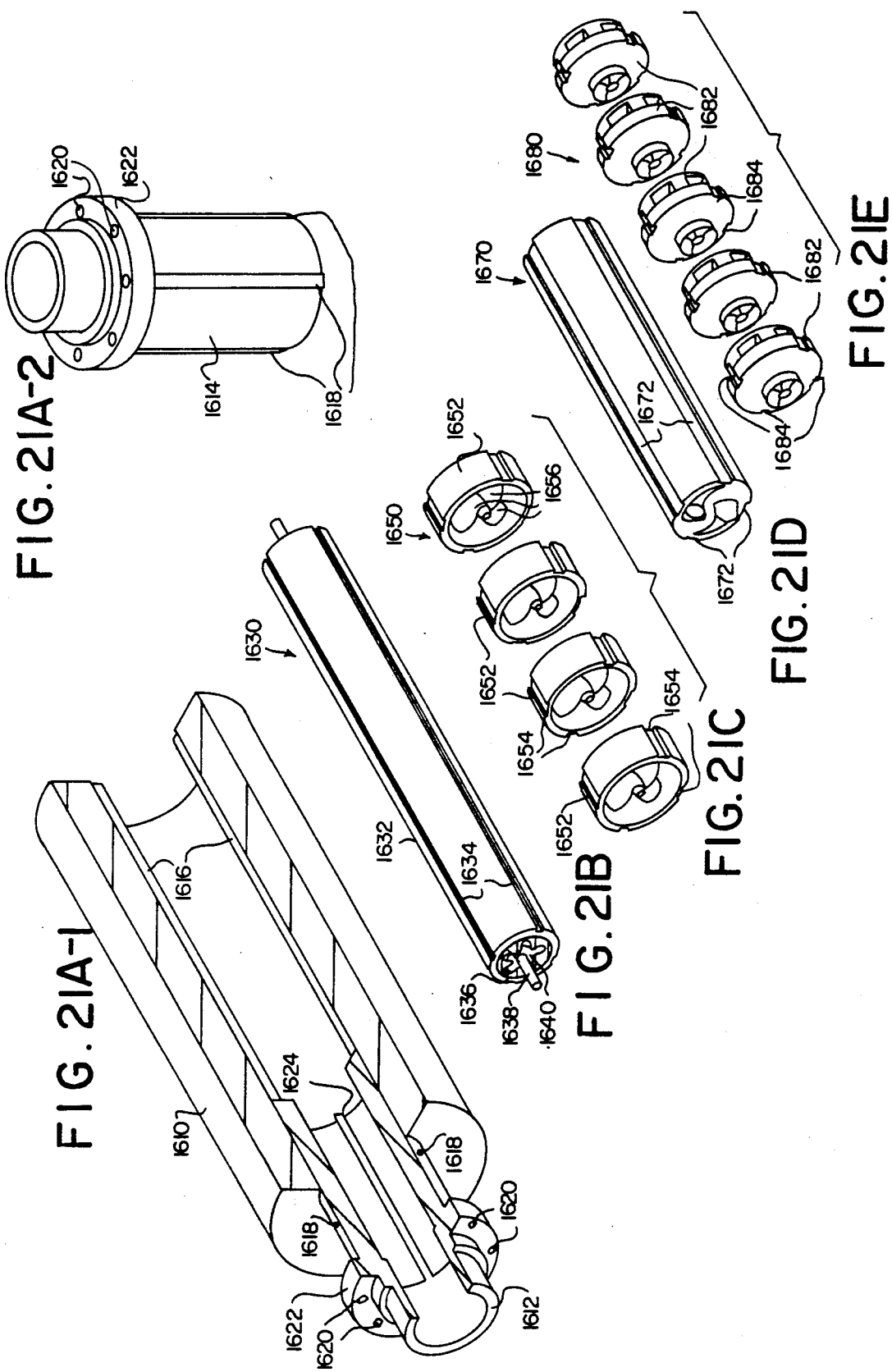

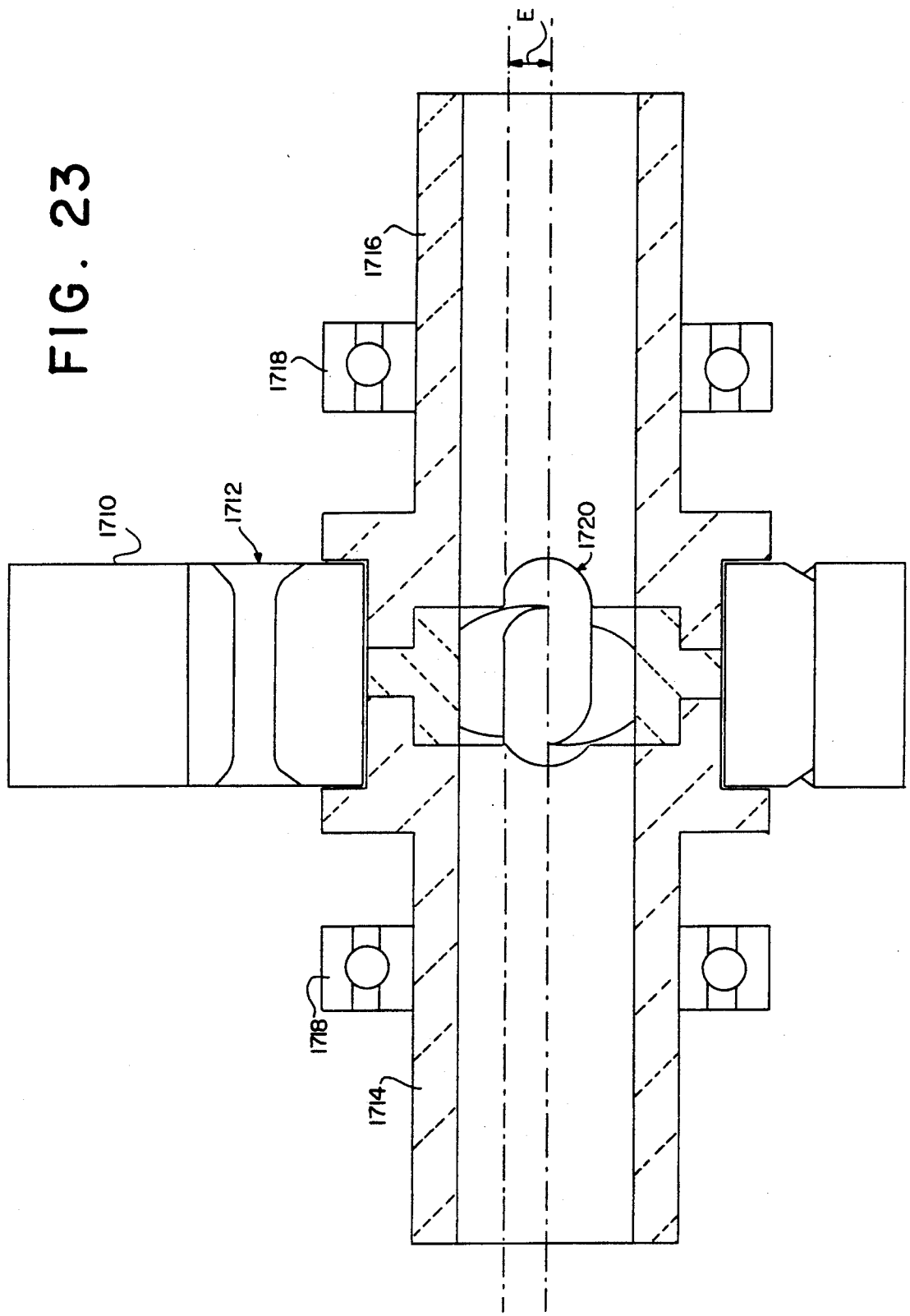

MULTI-FUNCTIONAL ROTARY HYDRAULIC MACHINE SYSTEMS

CROSS-REFERENCE TO RELATED APPLICATIONS

This application is a continuation-in-part of application Ser. No. 057,684 filed 26th May 1987, now abandoned which was a continuation of application Ser. No. 754,831 filed 12th July 1985 now abandoned.

BACKGROUND OF THE INVENTION

Various combined rotary pump/rotary drive systems are known from the prior art, but such systems are invariably single-function systems in the sense that the pumping unit is not replaceable by a unit having a different hydraulic function, i.e. the impeller unit is either not replaceable without major engineering work, or is replaceable only with an identical or functionally similar impeller.

One such prior example is shown in U.S. Pat. No. 3,804,553 issued to Hickey where the impeller is a complex multi-component structure (FIG. 2) that cannot be removed and replace in one piece, but requires a long and complex series of painstaking assembly operations in the confined space of a one-piece rotor (FIGS. 3 to 13). Although Hickey refers to "a multiplicity of different fluid flow functions", it is clear from column 5, lines 34 to 50 that only hydrokinetic impellers with individually mounted blades are actually referred to (lines 36 to 37), all such impellers necessarily being assembled and demounted piece-by-piece through the open centre of a one-piece rotor tube. Hickey neither makes provision for nor suggests that impeller units can be assembled and removed as complete integral units, nor that hydrokinetic impellers could be substituted by hydraulic units of a quite different function that necessarily must be in a form not susceptible of being provided in a multitude of individual components smaller than the diameter of the assembled hydraulic unit and hence capable of passing through a one-piece rotor bore. In particular, Hickey provides only a one-piece rotor tube and neither suggests nor allows for half-shafts (see below) to allow the fitting of a selected one of a plurality of mechanically interchangeable but hydraulically functionally different rotary hydraulic machine units.

OBJECTS OF THE INVENTION

It is a primary object of the invention to provide a new and improved multi-functional rotary hydraulic machine having a rotor assembly comprising a pair of half-shafts by which the rotor assembly is rotatably mounted within a stator assembly, the pair of half-shafts allowing the mounting of any selected one of a plurality of mechanically interchangeable and hydraulically functionally different rotary hydraulic machine units selectively interchangeable as individually complete units without requiring sub-division to a plurality of sub-units or components individually incapable of providing a rotary hydraulic machine unit function. It is a further object of the present invention to provide a multi-functional rotary hydraulic machine system comprising a multi-functional rotary hydraulic machine having a rotor assembly comprising a pair of half-shafts by which the rotor assembly is rotatably mounted within a stator assembly, and a plurality of mechanically interchangeable and hydraulically functionally different rotary hydraulic machine units of which any selected one unit is rotatably mounted within and rotationally coupled to the rotor assembly for rotation therewith, these machine units being selectively interchangeable as individually complete units without requiring sub-division to a plurality of sub-units or components individually incapable of providing a rotary hydraulic machine unit function.

It is a subsidiary object of the invention that at least one rotary hydraulic machine unit is a volumetric machine unit and at least one other rotary hydraulic machine unit is a hydrokinetic machine unit. It is a further subsidiary object of the invention that at least one rotary hydraulic machine unit is a single-stage machine unit and at least one other rotary hydraulic machine unit is a multi-stage machine unit.

SUMMARY OF THE INVENTION

These and other objects of the invention are achieved by providing a multi-functional rotary hydraulic machine comprising:

(a) a static outer casing;

(b) a prime mover comprising a stator assembly and a rotor assembly, said stator assembly being mounted within and encased by said static outer casing;

(c) said rotor assembly comprising a pair of half-shafts by which said rotor assembly is rotatably mounted within said stator assembly;

(d) said rotor assembly comprising mounting and coupling means by which a selected one of a plurality of mechanically interchangeable and hydraulically functionally different rotary hydraulic machine units is mounted within and coupled to said rotor assembly for rotation therewith.

The objects of the invention are also achieved by providing a multi-functional rotary hydraulic machine system comprising:

(a) a plurality of mechanically interchangeable and hydraulically functionally different rotary hydraulic machine units; and (b) a multi-functional rotary hydraulic machine, wherein said machines comprises:

(i) a static outer casing;

(ii) a prime mover comprising a stator assembly and a rotary assembly, said stator assembly being mounted within and encased by said static outer casing;

(iii) said rotor assembly comprising a pair of half-shafts by which said rotor assembly is rotatably mounted within said stator assembly;

(iv) said rotor assembly comprising mounting and coupling means by which a selected one of said plurality of different rotary hydraulic machine units is mounted within and coupled to said rotor assembly for rotation therewith.

BRIEF DESCRIPTION OF THE DRAWINGS

Embodiments of the invention will now be described, by way of example, with reference to the accompanying drawings, in which:

FIG. 5 is a part sectional side view of a second embodiment of a fluid machine according to the present invention;

FIG. 6 is a sectional side view of the rotor assembly of the fluid machine of FIG. 5 showing the parts in spaced relationship;

FIGS. 21A-1–21E schematically illustrate the rotor assembly of a multi-functional rotary hydraulic machine system, with FIGS. 21A-1 and 21A-2 showing the common rotor assembly, and FIGS. 21B to 21E showing four mechanically interchangeable and hydraulically functionally different rotary hydraulic machine units that can operatively fit in the common rotor assembly of FIGS. 21A-1 and 21A-2;

FIG. 23 is a longitudinal section of another hydraulic machine system utilising a Wankel engine as a prime mover;

DESCRIPTION OF PARTICULAR EMBODIMENTS

Figure 1:
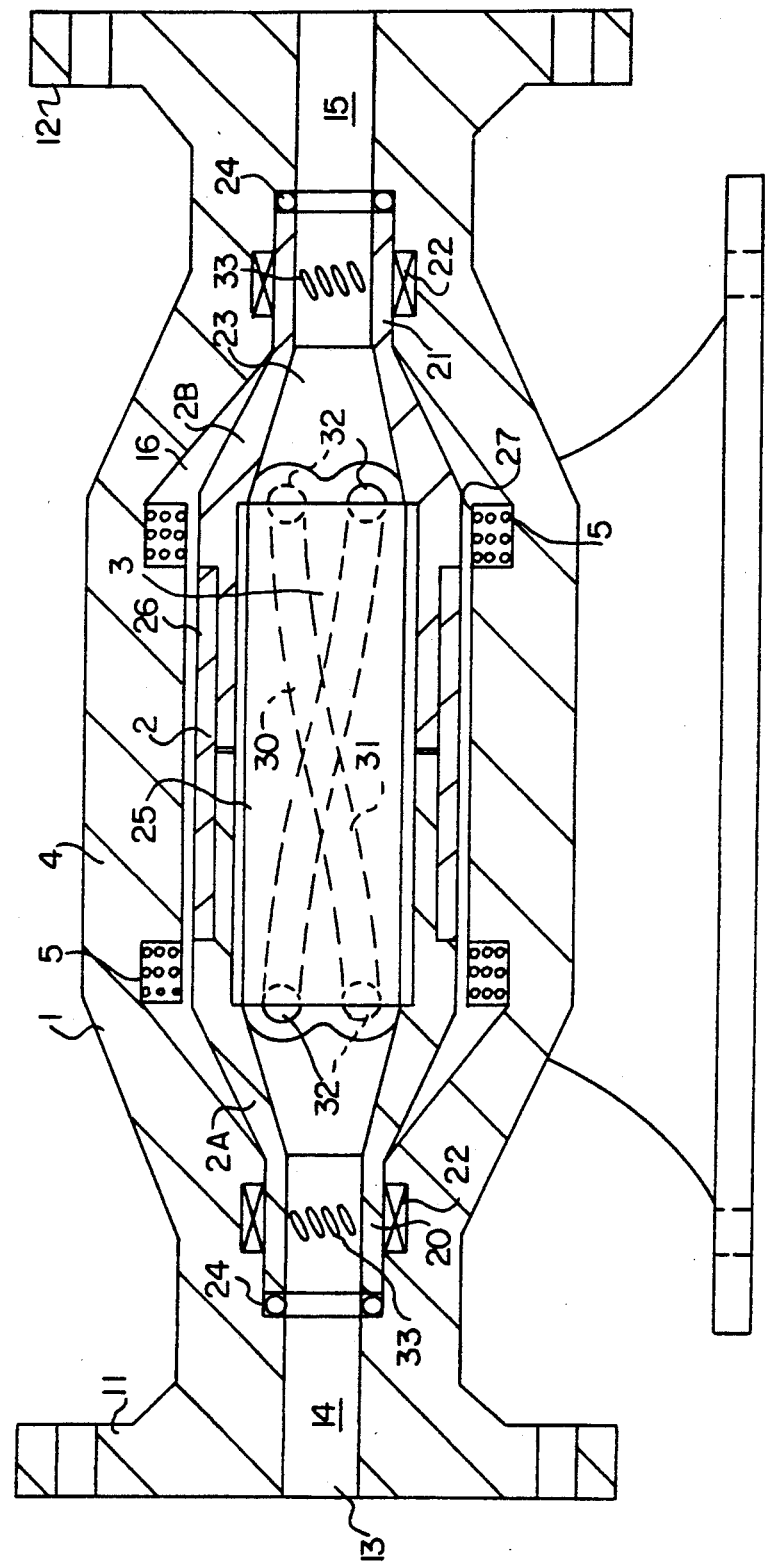
FIG. 1 is a sectional side view of one embodiment of a fluid machine according to the present invention.

Referring to FIGS. 1 to 4 of the drawings, a fluid machine comprises a casing 1 and a rotor assembly 2 provided with a rotary hydraulic machine unit in the form of a twin-volute cylindrical pump rotor 3. The rotor assembly 2 is in the form of two half-shafts 2A and 2B by which the pump rotor 3 is rotatably mounted within the casing 1 and rotationally coupled to the rotor assembly 2 for rotation therewith.

The casing 1 has a central portion 4 and is provided with two flanges 11 and 12 to enable the machine to be connected to upstream and downstream pipework respectively.

A through bore 13 is provided in the casing 1, the bore 13 having end portions 14 and 15 and a wider central portion 16 for accommodating the rotor assembly 2.

The central portion 4 of the casing 1 acts as the stator of an alternating current induction motor and is provided with a number of stator coils 5 which produce a rotating magnetic field when energised with polyphase alternating current or split-phase single-phase alternating current from a suitable power supply at a fixed frequency or at a controllably variable frequency.

The rotor assembly 2 has a central motor rotor portion 26 located within the central portion of the bore 13 of the casing 1 and the half-shafts 2A and 2B have end portions 20 and 21 rotatably supported by respective sets of bearings 22 mounted in the casing 1. A hydraulic flow-carrying through bore 23 is provided in the rotor assembly 2, the end portions 20 and 21 of which are of similar diameter to the end portions 14 and 15 of the bore 13.

Seals and thrust units 24 are provided at the end portions 20 and 21 between the casing 1 and the rotor assembly 2 to prevent fluid gaining access to the central portion 16 of bore 13 and to prevent axial movement of the rotor assembly 2.

The bore 23 has a wider central portion 25 to accommodate the cylindrical pump rotor 3.

The central portion 26 of the rotor assembly 2 acts as the rotor of the a.c. induction motor and rotates at a suitably sub-synchronous fraction of the rotational speed of the rotating magnetic field produced by the stator coils 5. An annular air gap 27 is provided between the rotor assembly 2 and inner surface of the central portion 4 of the body 1.

The pump rotor 3 is provided with two volutes 30 and 31 which pass through the body of the rotor 3. The edges of the volutes 30 and 31 are provided with ports 32 arranged normal to the axis of rotation of the rotor such as to induce fluid to flow through the volutes 30 and 31 as the rotor 3 rotates.

Additional booster blades 33 are provided in the end portions 20 and 21 of the bore 23 to assist propulsion of the fluid through the machine and to provide homogeneity in instances where the fluid exists in more than one phase or where mass flow metering is required.

In use, the machine operates as an electrically operated pump, fluid being propelled through the rotor assembly 2 by the rotating pump rotor 3 and the booster blades 33. As the direction of rotation of the rotor assembly 2 may be reversed the machine can be used to propel fluid in either direction.

The fluid passing through the machine acts as coolant for the electric motor and so minimises the need for additional cooling apparatus.

The machine system schematically illustrated in FIGS. 1 to 4 is particularly suitable for low-pressure or vacuum pumping of gases as well as liquids and mixed-phase gas/liquid mixtures.

Referring now to FIGS. 5 to 10, a fluid machine comprises a casing 100 and a rotor assembly 120 having a fluid reaction member 130.

The casing 100 is hollow and is formed of two halves 101 and 102 which are held together by nuts and studs 103. Two end flanges 104 and 105 are provided on the casing 100 to connect the machine to upstream and downstream pipework (not shown). The casing 100 has a central portion 106 in which there is mounted the stator 107 of an alternating current squirrel cage induction motor. The stator 107 is provided with stator coils 108 and is secured to the casing 100 by bolts 109.

The fluid reaction member 130 is provided with a four blade Archimedean-screw shaped impeller 131 fixedly mounted in and rotationally coupled to a hollow cylinder 132. The cylinder 132 is provided with four longitudinally extending slots 133 on its outer surface shaped to accept keying members 115 which project from the flanges 116 and 117 provided on two hollow half-shafts 121 and 122 (see FIG. 6). The half-shafts 121 and 122 are located over respective ends of the cylinder 132. Seals 134 are provided between the cylinder 132 and the inner faces of the flanges 116 and 117 of the shafts 121 and 122. Seals 123 are also provided between the ends of each of the keying members 115 on the half-shafts 121 and 122. A squirrel cage 124 of the electric motor is located on the outer surface of the rotor assembly 120 and is secured in place by bolts 125 which pass through the flanges 116 and 117 on the half-shafts 121 and 122 into the ends of the squirrel cage 124. Seals 126 are provided between the end portions of the cage 124 and the flanges 116 and 117.

The rotor assembly 120 is mounted on bearings 127 within the central portion 106 of the casing 100. Seals 128 are provided at the end portions of the half-shafts 121 and 122 to prevent the working fluid from gaining access to the bearings 127 and the innards of the electric motor.

At the upstream and downstream openings 110 and 111 of the casing 100 straightening vanes 112 are provided to reduce the rotary motion imparted on the fluid by the impeller 131. On energisation of the coils 108 of the stator 107 the rotor assembly 120 is caused to rotate. The machine then pumps fluid in either direction and may be operated at an appropriate speed as desired by suitable variation of the power supply, particularly by controlling the voltage and/or the frequency of the power supply.

The rotor assembly as shown in FIG. 6 is provided with a rotary hydraulic machine unit to suit the application of the hydraulic machine system and examples of alternative rotary hydraulic machine units are shown in FIGS. 11 to 14.

Figure 11:
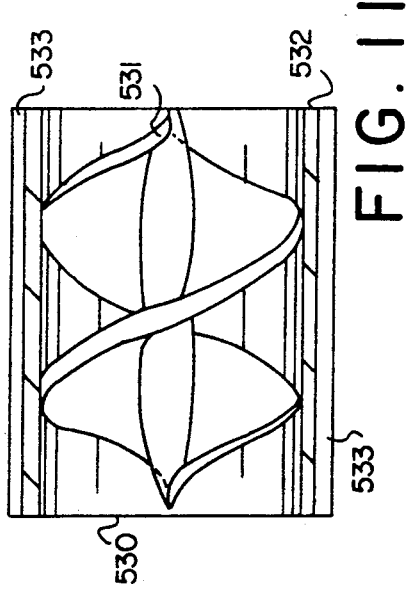

FIG. 11 shows a rotary hydraulic machine unit 530 having a two-blade Archimedean-screw type impeller 531 rigidly mounted in and rotationally coupled to a hollow shaft 532 in the form of two detachable half-shafts. The outer face of the half-shaft assembly 532 is provided with longitudinal slots 533 to engage the keying members 115 when the fluid reaction member 530 is located in the rotor assembly 120.

Figure 12:
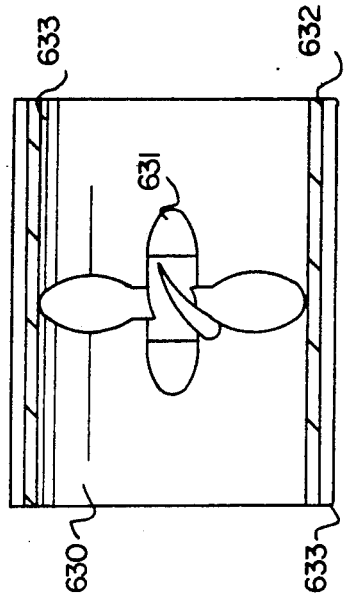
FIGS. 11 to 14 are part sectional views of alternative rotary hydraulic machine units for use in the rotor assembly of FIG. 6.

FIG. 12 shows a rotary hydraulic machine unit 630 which has a propeller type impeller 631 fixedly mounted within a hollow shaft 632. The outer surface of the shaft 632 is provided with longitudinal slots 633 for engaging with the keying members 115.

Figure 13:
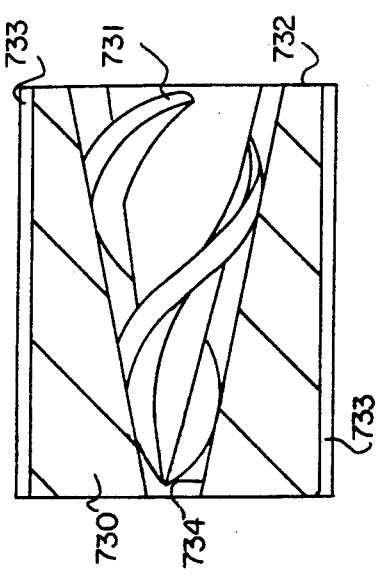

FIG. 13 shows a rotary hydraulic machine unit 730 which has a cone-shaped helical bladed impeller 731 which is fixedly mounted in shaft 732 having a conical through bore 734. The outer face of the shaft 732 is provided with longitudinal slots 733 for engaging with the keying members 115.

Figure 14:
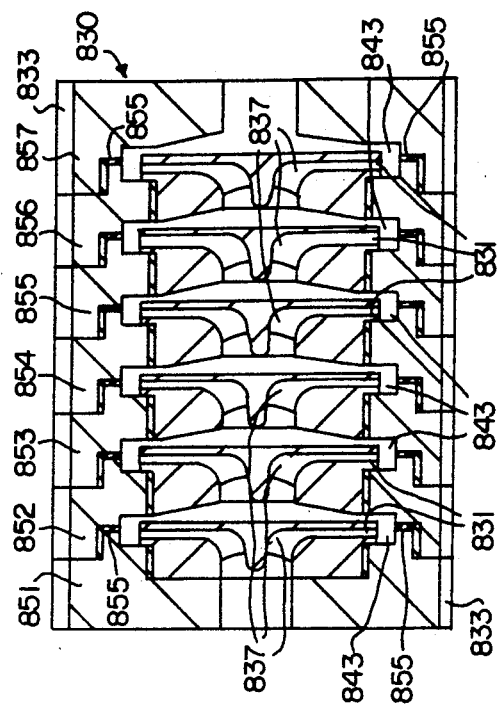

FIG. 14 shows a rotary hydraulic machine unit 830 made up from a number of shaft portions 851 to 857 these being an inlet shaft portion 851, an outlet shaft portion 857 and five intermediate shaft portions 852 to 856. Between each shaft portion 851 to 857 there is provided a centrifugal pump stage 831, each stage 831 having an impeller 837 and a diffuser 843. Each stage 831 is screwed into a shaft portion 851 to 857. Adjacent shaft portions 851 to 857 are screwed into one another, seals 855 being provided between each section. Longitudinal slots 833 are provided on the outer faces of the shaft members 851 to 857 for engaging with the keying members 115.

Figure 15:
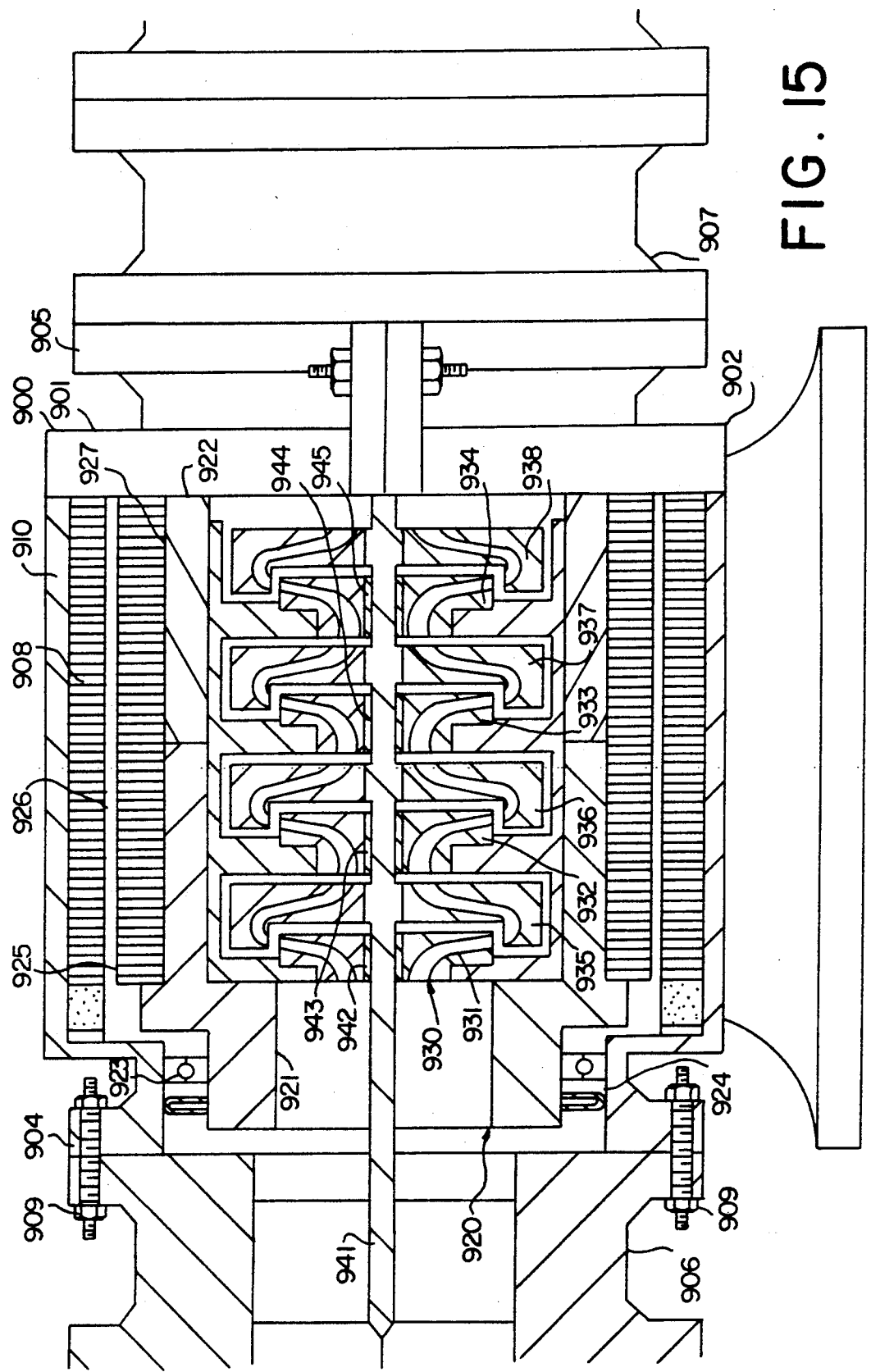
FIG. 15 is a part sectional side view of a third embodiment of a fluid machine according to the present invention.

Referring now to FIG. 15, a fluid machine comprises a casing 900 containing a rotor assembly 920 in which there is mounted a rotary hydraulic machine unit in the form of a pump assembly 930.

The casing 900 is hollow and is in the form of a split casing made up from two halves 901 and 902 which are held together by nuts and studs 903.

The casing 900 is provided with a central portion 910 and end flanges 904 and 905 for connection by studs and nuts 909 to an upstream stool piece 906 and a downstream stool piece 907. The central portion 910 of the casing 900 accommodates the stator 908 of an electric motor.

The rotor assembly 920 is formed of two stepped half-shafts 921 and 922 which are rotatably supported at their end portions by bearings 923. Seals 924 are fitted between the casing 900 and the half-shafts 921, 922 to prevent the pumped fluid gaining access to the bearings.

The rotor assembly 920 has a central portion 927 provided with a squirrel cage 925 and spaced from the stator 908 on the casing 900 by an air gap 926.

The pump assembly 930 is a multi-stage hydrokinetic pump of the centrifugal type and comprises four impellers 931 to 934 fixedly mounted in the rotor assembly 920 and four diffusers 935 to 938 fixedly mounted to a static shaft 941 which passes through the centre of the rotor assembly 920. Seals 942 to 945 are provided between the shaft 941 and each impeller 931 to 934 to mitigate pressure losses through the pump assembly 930.

Figure 16:
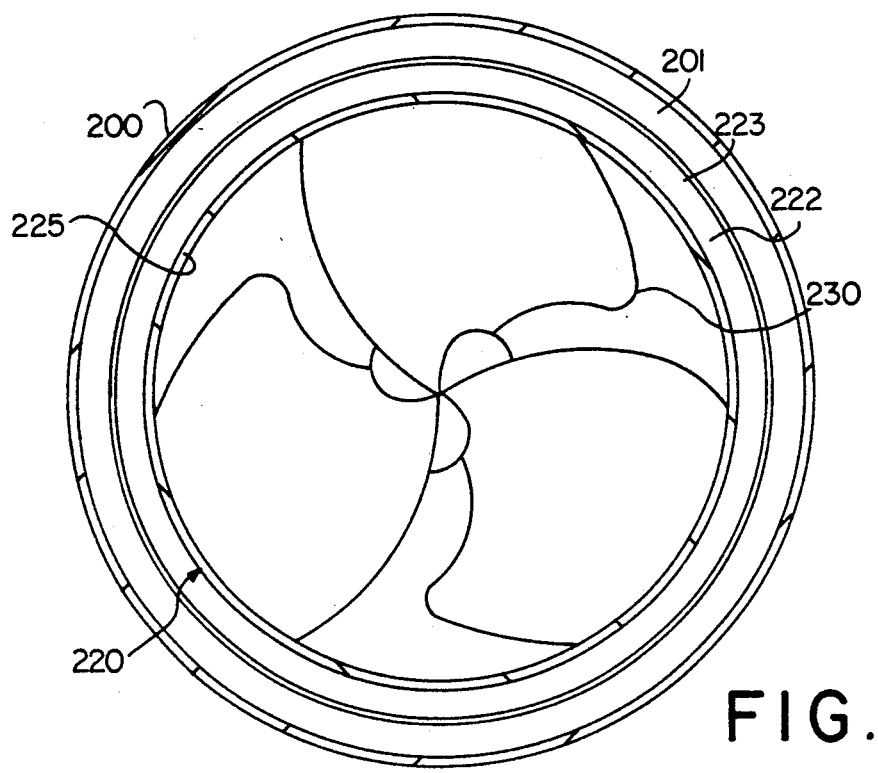
FIG. 16 is a part sectional end view of a fourth embodiment of a fluid machine according to the present invention.
Figure 17:
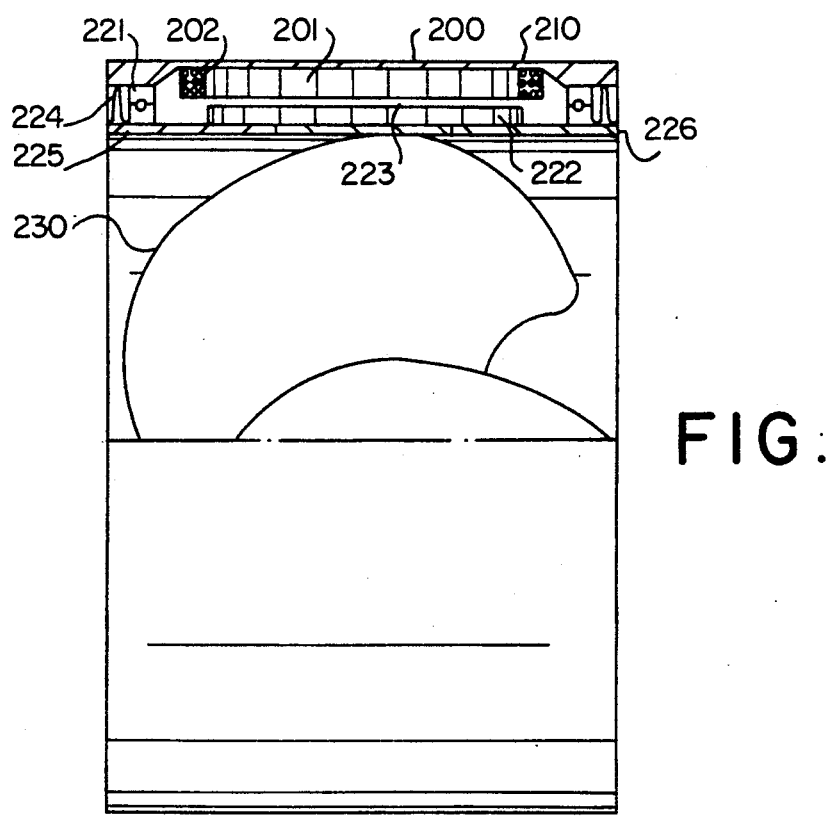
FIG. 17 is a part sectional side view of the fluid machine of FIG. 16.

Referring to FIGS. 16 and 17, a fluid machine comprises a cylindrical casing 200 and a rotor assembly 220 rotatably mounted within the casing 200 on bearing 221. The rotor assembly 220 comprises two hollow half-shafts 225 and 226 which mount a rotary hydraulic machine unit 230 between them.

The casing 200 has an enlarged inner central portion 210 which is provided with an electrical stator 201 having coils 202.

The rotor assembly 220 comprises the rotary hydraulic machine unit in the form of a propeller 230 which is mounted in the bore of the hollow half-shafts 225 and 226. The propeller 230 consists of an array of three spiral blades, and different numbers of blades may be employed as required. The rotor assembly 220 is provided with a squirrel cage rotor 222 on its outer surface, an air gap 223 being provided between the cage rotor 222 and the stator 201.

Seals 224 between the casing and the rotor assembly 220 protect the bearings 221 and the electrical parts from the ingress of the working fluid.

The fluid machine may be used as a ventilating fan or may be mounted on a water craft. In the latter case the machine is positioned below the water line and the rotating propeller 230 drives the craft in place of a conventional shaft driven propeller.

The apparatus may be placed in a pipeline carrying water or oil travelling at a high speed. The propeller 230 is then rotated by the water or oil passing through the rotor assembly 220 and the rotation of the propeller 230 causes the rotor assembly 220 to rotate. This rotation would induce electric currents in the coils 202 of the stator 201 and the hydraulic machine system acts as a hydro-electric generator.

Figure 18:
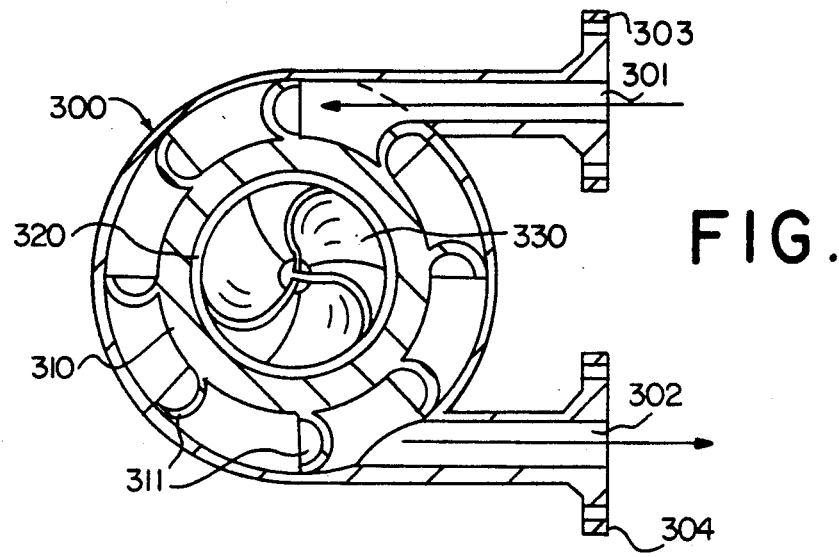
FIG. 18 is a sectional end view of a Pelton wheel driven fluid machine according to the present invention.

Referring to FIG. 18, a Pelton wheel driven pump comprises a casing 300 having an inlet port 301 and outlet port 302. A Pelton wheel 310 is mounted on the outer surface of a hollow shaft 320 on the inside of which there is provided a fluid reaction member in the form of a propeller 330.

A propulsion fluid travelling at a high velocity enters the casing 300 through the inlet port 301 which is provided with a flange 303 for connection to upstream pipework (not shown). The fluid may be steam, air, oil or gas, or a mixture of gas and liquid phases.

The fluid acts upon the blades 311 of the Pelton wheel 310, causing the wheel to rotate and then passes out of the casing through the outlet port 302. The outlet port 302 is provided with a flange 304 for connection to downstream pipework (not shown).

The rotation of the Pelton wheel 310 causes the shaft 320 and the propeller 330 to rotate causing fluid to be pumped through the shaft 320.

Figure 19:
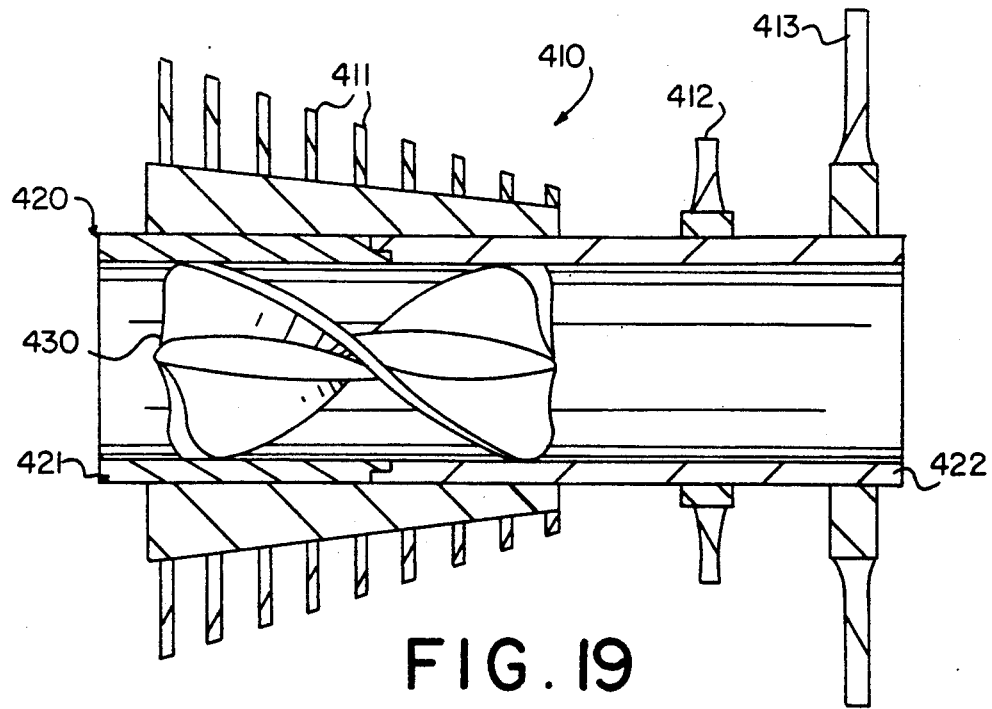
FIG. 19 is a sectional side view of a gas turbine driven rotor assembly of a fluid machine according to the present invention.

Referring to FIG. 19, a gas turbine driven rotor assembly 410 comprises a rotary hydraulic machine unit in the form of a screw type impeller 430 mounted within a hollow shaft 420 consisting of a detachable pair of half-shafts 421 and 422.

Axial compressor blades 411, first stage turbine blades 412 and second stage turbine blades 413 are mounted on the outer surface of the shaft 420.

Figure 20:
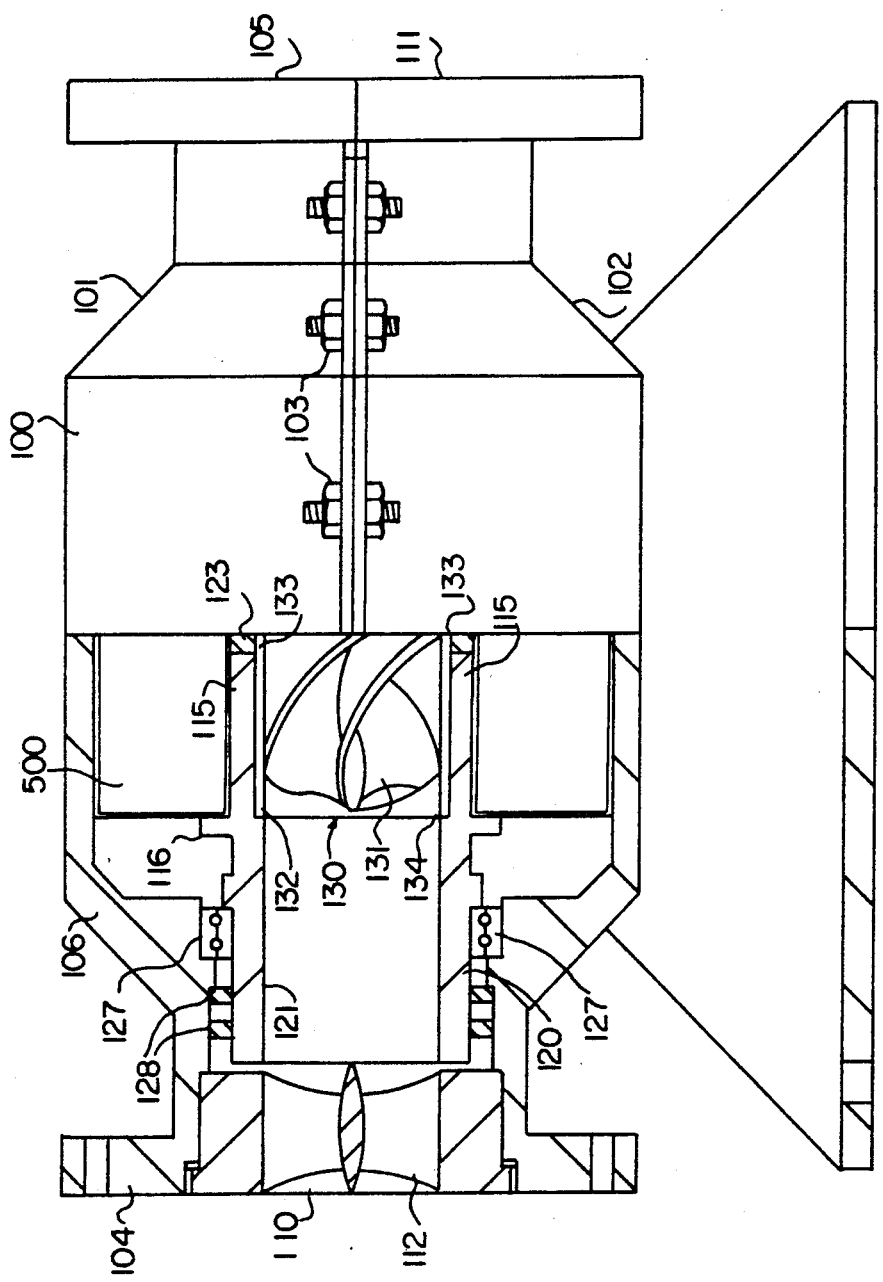
FIG. 20 is a part sectional side view of a further embodiment of a fluid machine utilising a Wankel engine.

In a further embodiment of the present invention the drive means for rotating the rotor assembly may be either a normal reciprocating combustion engine provided with a hollow crank or, more suitably, a Wankel-type combustion engine which operates in a rotary manner. This is illustrated in FIG. 20 which is a fluid machine similar to that shown in FIG. 5 and corresponding parts are therefore accorded like reference numerals. The squirrel cage induction motor is replaced by a Wankel-type engine shown generally at 500.

FIGS. 21A-1 to 21E schematically illustrate the rotor assembly of a multi-functional rotary hydraulic machine system in accordance with the invention. The stator assembly is not shown, but may be a combined casing and induction motor as shown in FIGS. 1 or 15, or (with a suitable modification of the prime mover rotor) a fluid motor as shown in FIGS. 18 or 19, or a Wankel-type drive as shown in FIG. 20.

Figure 2:
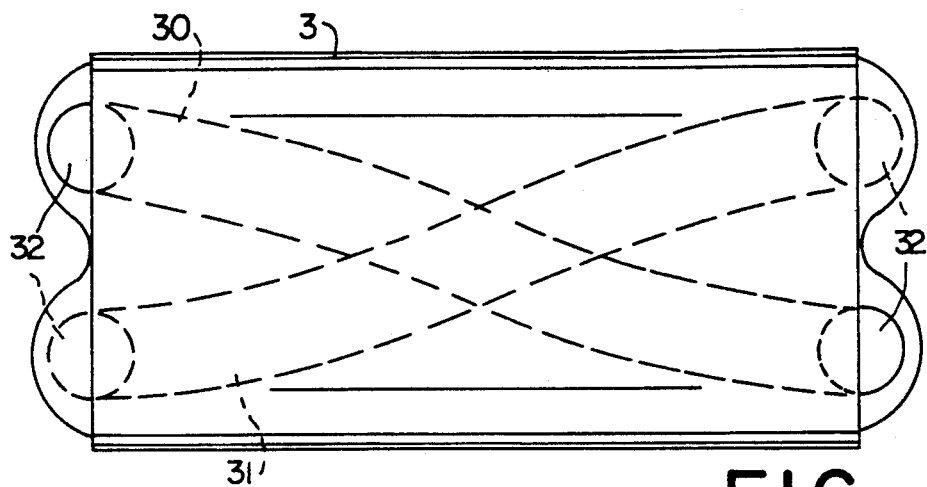
FIG. 2 is a side view of the rotary hydraulic machine unit of the machine of FIG. 1.
Figure 3:
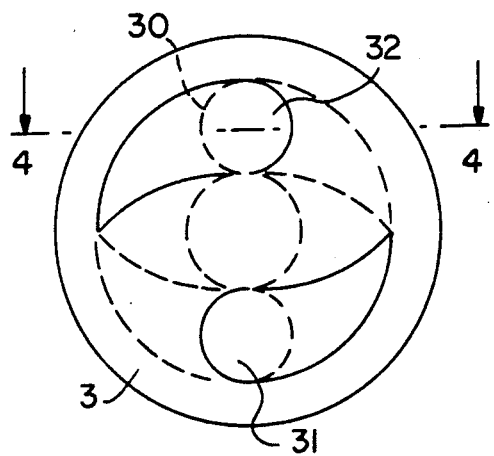
FIG. 3 is an end view of the rotary hydraulic machine unit of FIG. 2.
Figure 4:
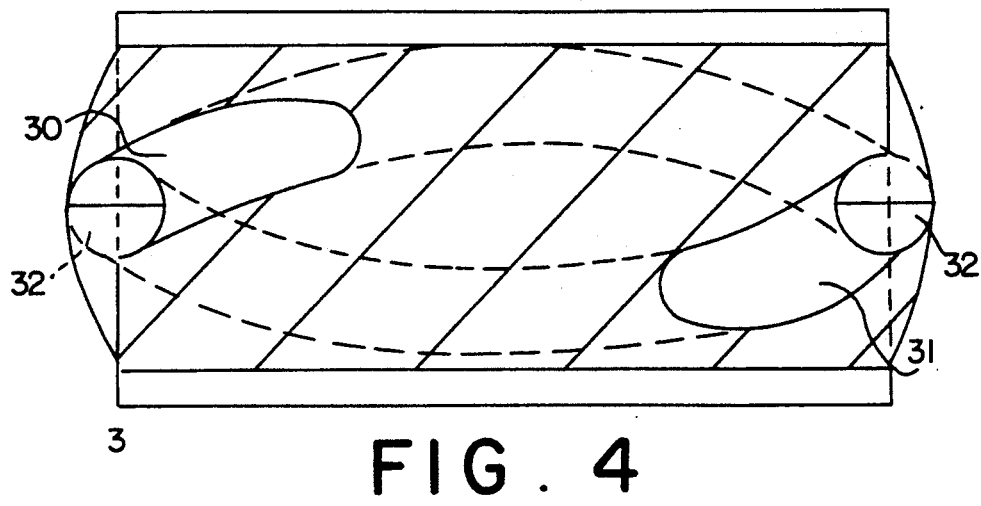
FIG. 4 is a sectional plan view of the rotary hydraulic machine unit of FIG. 3 taken along the line 4—4.
Figure 8:
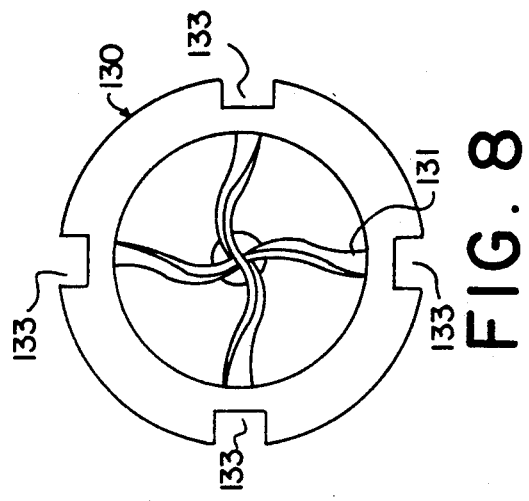
FIG. 8 is an end view of the Archimedean-screw member of FIG. 7.
Figure 10:
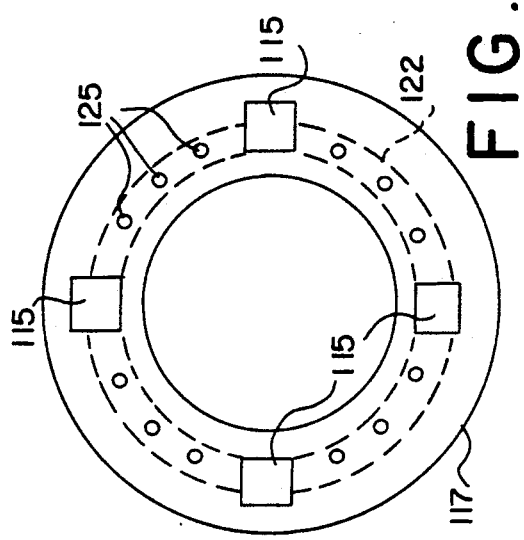
FIG. 10 is an end view of the half-shaft of FIG. 9.
Figure 7:
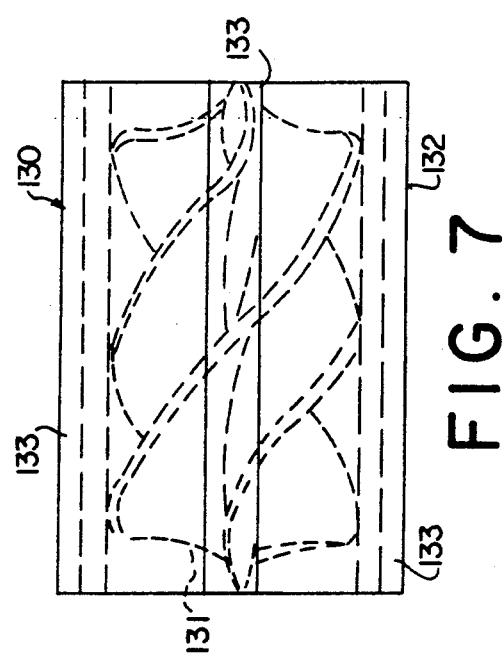
FIG. 7 is a side view of a Archimedean-screw type rotary hydraulic machine unit for use in the rotor assembly of FIG. 6.
Figure 9:
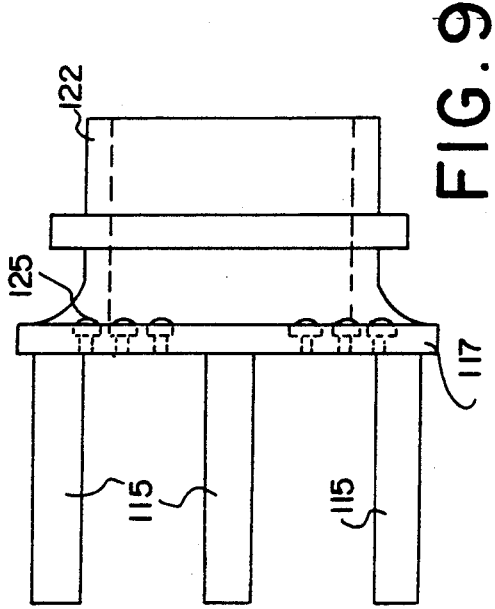
FIG. 9 is a side view of a half-shaft of the rotor assembly of FIG. 6.

Referring to FIGS. 21A-1 and 21A-2 in detail, in detail, a schematically depicted squirrel cage rotor 1610 is rotatably mounted on a pair of detachable half-shafts 1612, 1614, to which it is coupled by longitudinal internal slots 1616 engaging longitudinal external keys 1618 formed on the half-shafts 1612, 1614. The half-shaft 1612 is shown partially coupled to the rotor 1610, while the half-shaft 1614 is shown fully detached. The half-shafts 1612 and 1614 are rotatably supported on respective rotary bearings (not shown in FIG. 21A) carried within the stator and casing of the FIG. 21 machine, in the same manner as is schematically shown in FIG. 1 or FIG. 5 or FIG. 15 or FIG. 20. The rotor 1610 and the half-shafts 1612, 1614 are axially clamped together by bolts (not shown) passing through holes 1620 axially formed in radial flanges 1622 integrally formed on the half-shafts 1612, 1614.

Each of the half-shafts 1612, 1614 is formed with longitudinal internal keys 1624 by which a selected one of a plurality of mechanically interchangeable and hydraulically functionally different rotary hydraulic machine units (detailed below with reference to FIGS. 21B to 21E) can be exchangeably mounted within and coupled to the rotor 1610 for rotation thereby in operation of the machine system.

Figure 22B:
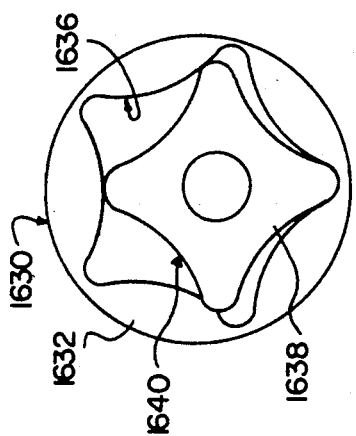
FIGS. 22A and 22B schematically illustrate a longitudinal section and end elevation of a Moineaux progressive cavity positive displacement pump utilisable as a hydraulic machine unit in the hydraulic machine system of the invention.
Figure 22A:
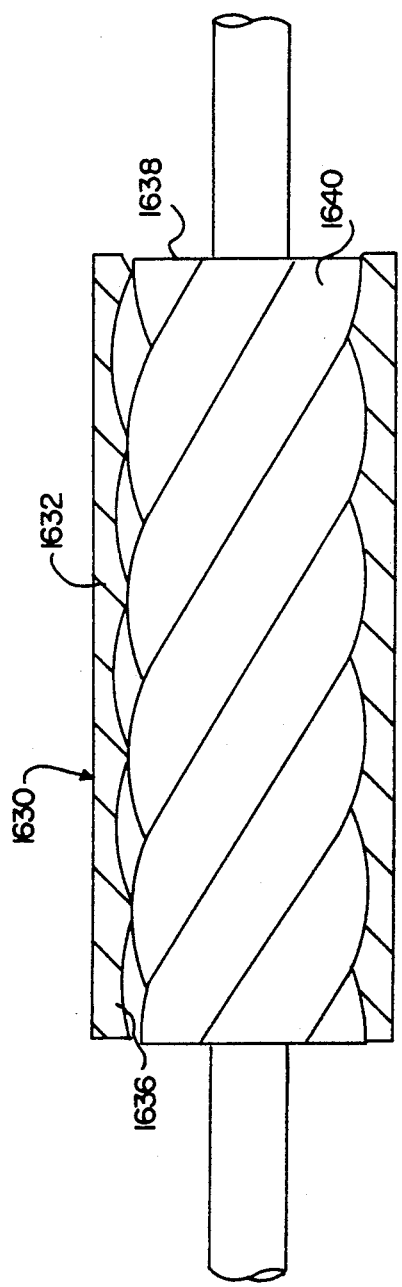

The first of four such interchangeable rotary hydraulic machine units is shown in FIG. 21B, and consists of a twin-rotor Moineaux progressive cavity positive displacement pump 1630 (shown in greater detail in FIGS. 22A and 22B). The outer rotor 1632 of the Moineaux pump 1630 is outwardly cylindrical, with longitudinal slots 1634 by which the pump 1630 is rotatably and axially coupled to the internal keys 1624 in the half-shafts 1612 and 1614. The outer rotor 1632 is internally formed with a five-lobed epitrochoidal surface 1636 in a suitable material, such as hard rubber. The lobed rotor surface 1636 has an axially progressive angular displacement along the outer rotor 1632, i.e. an internal five-start spiral, as is known for Moineaux-type pumps.

The Moineaux pump 1630 further comprises an inner rotor 1638 which is eccentrically mounted within the outer rotor 1632 for rotation about its own rotation axis parallel to and slightly displaced from the common rotation axis of the outer pump rotor 1632 and of the driving rotor 1610. The inner rotor 1638 is externally formed with a four-lobed hypotrochoidal surface 1640 in a suitable material, such as polished and hardened stainless steel. The lobed rotor surface 1640 has an axially progressive angular displacement along the inner rotor 1638, i.e. an external four-start spiral which intermeshes with the five-lobed outer rotor surface 1636 along the length of the pump 1630, in the manner known for Moineaux-type pumps.

The intermeshing of the five-lobed outer rotor inner surface 1636 with the four-lobed inner rotor outer surface 1640 means that rotation of the outer pump rotor 1632 (driven by the prime mover rotor 1610) rotationally drives the inner rotor 1638 by the gear-like coupling of the surfaces 1636 and 1640 due to the intermeshing of their respective lobes, with four revolutions of the outer rotor 1532 producing five revolutions of the inner rotor 1638. In the manner known for Moineaux-type hydraulic machines, such intermeshing of the spiral-form five/four lobed surfaces 1636/1640 results in cavities which axially progress along the pump 1630 to produce volumetric pumping, i.e. positive displacement of hydraulic fluid in a constant volume (neglecting leakage, cavitation, etc.) per revolution. Depending on the relationship of the spiral progression of the lobes (left-hand or right-hand) and the direction of rotation (clockwise or anti-clockwise), rotation of the pump 1630 will draw in hydraulic fluid at one end and deliver it at the other end, without the need of ports or valves, the direction of axial pumping depending on the aforementioned relationship. As is known in the art of hydraulic pumps, Moineaux-type pumps are particularly useful for producing high pressure rises in a compact volume without valves, and readily tolerate a proportion of suspended solids (such as sand and clays or "mud") that would be detrimental to other forms of positive displacement pump.

FIG. 21C shows another form of hydraulic machine unit 1650 which is mechanically interchangeable with the Moineaux-type pump 1630 of FIG. 21B in the machine system of FIG. 21A. In contrast to the volumetric or positive-displacement pumping function of the pump 1630, the hydraulic machine unit 1650 is a hydrokinetic pump in which the rotational velocity of the pumping element(s) produces an increase in pressure and/or flow rate.

The hydraulic machine unit 1650 consists of a plurality of individual propeller units 1652, each having peripheral keyway in the form of longitudinal slots 1654 by which the propeller units are mounted within and rotationally coupled to the keys 624 in the half-shafts 1612 and 1614. Each propeller unit 1652 has an array of angled blades 1656 (shown by way of example as three in number) to form an axial-flow hydrokinetic impeller of known form. Each propeller unit 1652 may have its blades 1656 at a constant pitch angle from unit to unit, or the pitch angles may progressively increase from the input end of the pump 1650 to the output end, i.e. in the direction of axial flow through the pump 1650. Diffuser units (not shown) may be installed between each propeller unit 1652. The number of propeller units 1652 (shown by way of example as four in FIG. 21B) comprised in the pump 1650 may be varied according to requirements from one upwards to a number limited by mechanical dimensions, available power or other limits.

In suitable circumstances, such as when hydraulic flow through the pump 1650 is sufficiently high, the pump 1650 may be operated as a hydrokinetic motor with the hydraulic flow driving the propeller units 1652 and hence rotationally driving the rotor 1610. Where the prime mover is an electric motor, such driving or hydraulic motoring of what is normally the hydraulic pump unit can be used to generate electric power from the hydraulic flow (in contrast to the consumption of electricity to boost the hydraulic flow in the pumping mode). Suitable loading or capacitative excitation of the stator of the squirrel cage motor (when such is employed) allows the electric machine to generate electric power at super-synchronous rotational speeds, or alternative forms of electric machine may be utilised when generator operation is contemplated, for example permanent magnet rotors in conjunction with suitably wound stators. In a complex hydraulic system, as for example in a sub-sea oil production system, the system of FIG. 21 can be adapted, as by suitable choice of the hydraulic machine unit, to boost hydraulic flow by pumping in regions of the sub-sea oil production system where there is a deficit of hydraulic power (e.g. in the vicinity of an injection well, or a depleted stripper well) utilising electric power generated elsewhere in the sub-sea oil production system in regions of surplus hydraulic power (e.g. in the vicinity of a producer well-head) by use of the hydraulic machine system of the invention in a power generating mode.

As further examples of the versatility of the hydraulic machine system of FIG. 21, the rotor assembly of FIG. 21A can readily accommodate the twin-volute rotor of the FIGS. 1 to 4 pumping system described above. Such a twin-volute rotor is generally denoted at 1670 in FIG. 21D, and is generally externally cylindrical with longitudinal peripheral slots 1672 for mounting within and rotational coupling to the half-shafts 1612, 1614 (FIG. 21A). External identity with the pump 1630 of FIG. 21B is readily apparent, and arises from the mechanical interchangeability of the various hydraulic machine units, despite their widely different hydraulic functions. The internal structure of the twin-volute rotor 1670 is as previously described with reference to FIGS. 1 to 4, and is particularly suited to vacuum pumping of gases, and other low-pressure, low volume flow rate applications.

A fourth example of mechanically interchangeable hydraulic machine unit is depicted in FIG. 21E at 1680. The unit 1680 is a hydrokinetic multi-stage pump formed by a pressure-compounding series cascade of centrifugal-outflow impeller units 1682. Each impeller unit 1682 has longitudinal or axial slots 1684 in its periphery for mounting within the half-shafts 1612, 1614 and rotational coupling to the half-shaft keys 1624. Each centrifugal-outflow impeller unit 1682 may be associated with or inserted into a diffuser (see FIG. 15 for details).

The hydaulic machine units of FIGS. 21B to 21E, and especially of FIGS. 21B and 21C, are particularly suited to the pumping of mixed-phase fluids, i.e. mixtures of gas and liquid (such as the randomly variable methane/oil mixture from a sub-sea producer well) which are variable over a wide range of gas-to-liquid ratios.

In similar fashion, any of the other rotary hydraulic units previously disclosed can readily be adapted to mechanically fit the machine system of FIG. 21A; for example, the Archimedean-screw of FIGS. 5 to 8, or other arrays of spirally-pitched volutes or blades as for example in FIGS. 11, 12, 13, 16, 17, 18, 19 and 20. In general, any form of rotary hydraulic or pneumatic machine unit can readily be adapted in accordance with the principles detailed above to be mechanically interchangeable with any other hydraulic or pneumatic machine unit within a common machine having a stator assembly and a rotor assembly of the form and function described. Thus the half-shafts of the present invention enable a multi-functionality not possible with the prior art, wherein mechanical interchangeability of hydraulic machine units having widely different hydraulic functions (as distinct from identical or extremly similar replacement units) is neither envisaged nor provided for.

FIGS. 22A and 22B show essential details of the Moineaux-type pump 1630 of FIG. 21B to an enlarged scale. For clarity only the outer rotor 1632 and the inner rotor 1638 are schematically depicted, with the keyway slots 1634 and rotational mountings (bearings, etc.) being omitted. The five-lobed inner surface 1636 of the outer rotor 1632 is shown in section, while the spirally-developed four-lobed outer surface 1640 of the inner rotor 1638 is shown in elevation in FIG. 22A. End views of both rotors 1632 and 1638 are shown in FIG. 22B to illustrate the form of the lobed surfacs 1636 and 1640, together with their intermeshing to form inter-rotor cavities that axially convey hydraulic fluid during operation of the pump 1630.

FIG. 23 schematically depicts a half-shaft mounted rotary hydrauliic machine unit in a machine system wherein the prime mover is a Wankel-type engine. In FIG. 23, the stator/"cylinder" part of the Wankel-type engine and its associated components, are omitted for clarity, only the triangular rotor/"piston" 1710 being shown together with its epitrochoidal gearing 1712 which carries the rotor/"piston" 1710 at an eccentricity "E" with respect to the rotation axis of the rotor assembly. The rotor 1710 and its gearing 1712 is supported on a pair of hollow half-shafts 1714 and 1716 which are in turn rotatably supported in a pair of rolling-element bearings 1718 mounted within the stator/casing assembly (not shown in FIG. 23) in a manner similar to that depicted in FIG. 20.

Mounted within and rotationally coupled to the half-shafts 1714, 1716 is a rotary hydraulic machine unit 1720, schematically depicted by way of example as a single propeller unit similar to that of FIGS. 12, 16, 17, or 21C. The hollow through bores of both half-shafts 1714 and 1716 allows axial hydraulic flow through the rotor assembly shown in FIG. 23, and hydraulic coupling to inlet and outlet ports or static pipework through rotary seals in the manner shown in FIG. 20.

By dismantling the rotor assembly shown in FIG. 23 and mutually separating the half-shafts 1714 and 1716, the propeller-type rotary hydraulic machine unit 1720 can be substituted by a mechanically interchangeable rotary hydraulic machine unit having a different hydraulic function, in accordance with the principle illustrated in FIGS. 21A-1 to 21E. Thus FIG. 23 illustrates the multi-functional functional rotary hydraulic machine system of the present invention where the prime mover is a Wankel-type machine or engine.

Figure 24:
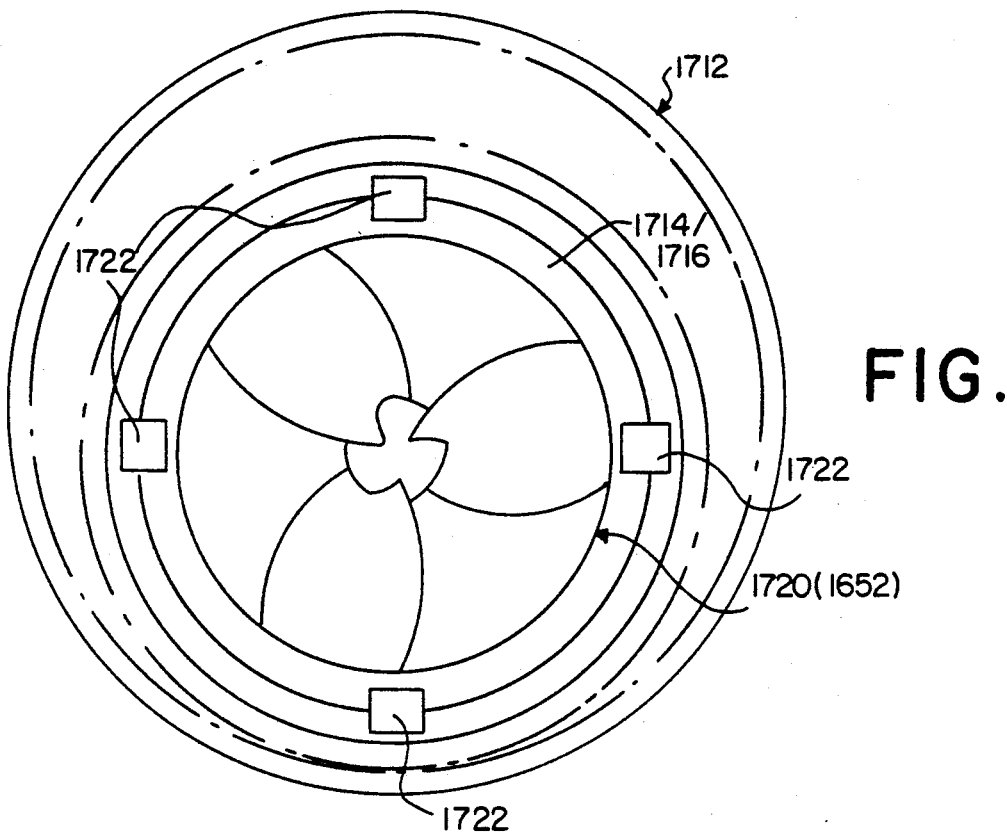
FIG. 24 is a schematic end elevation of a propeller rotor system for use in the Wankel-drive system of FIG. 23.
Figure 25:
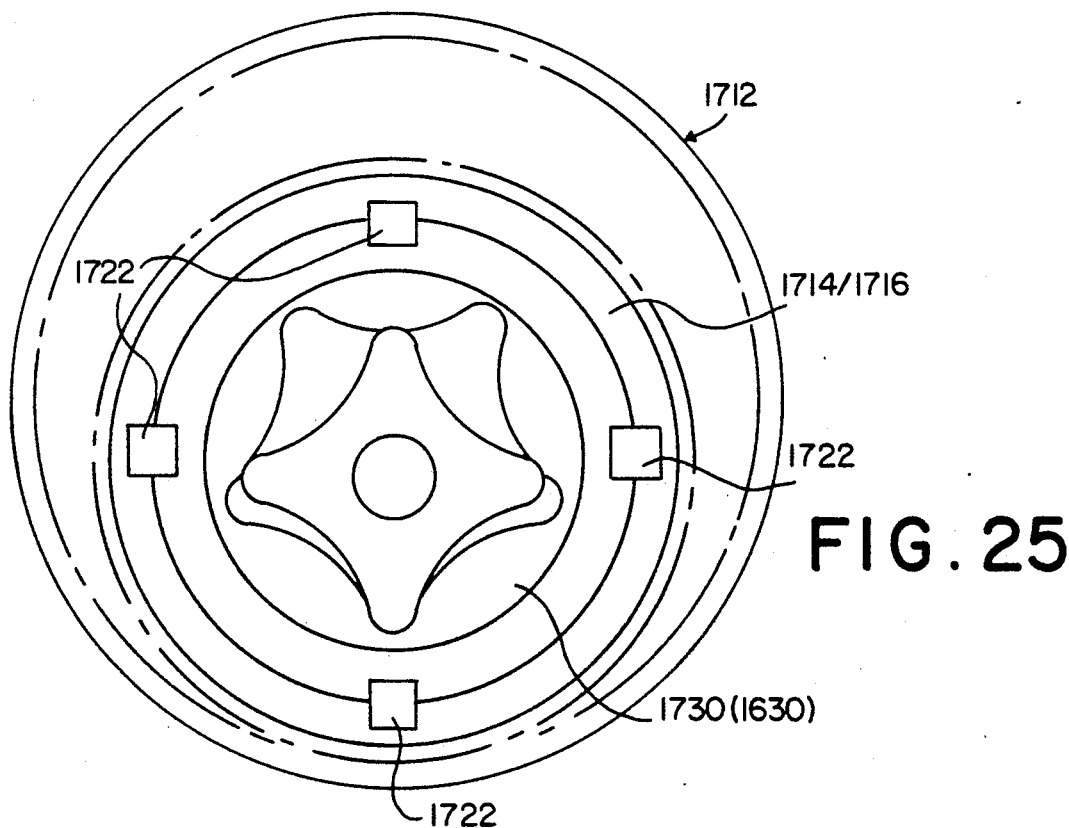
FIG. 25 is a schematic end elevation of a Moineaux pump machine unit mechanically interchangeable with the propeller motor system of FIG. 24.

By way of example, such mechanical interchange of hydraulically functionally different rotary hydraulic machine units is schematically depicted in FIGS. 24 and 25. FIG. 24 corresponds to an end view of the central part of FIG. 23 to depict the rotor gearing 1712 mounted on the half-shafts 1714, 1716, to which the propeller unit 1720 is rotationally keyed by a key and axial slot system denoted at 1722.

FIG. 25 corresponds to FIG. 24 and shows the hydrokinetic propeller unit 1720 replaced by a mechanically interchangeable but hydraulically functionally different rotary hydraulic machine unit in the form of a five/four-lobed double-rotor Moineaux-type progressive cavity volumetric or positive-displacement pump 1730 similar in principle to the Moineaux-type pump 1630 detailed in FIGS. 21B, 22A, and 22B. The interchangeability of rotary hydraulic machine units illustrated in FIGS. 23 and 24 can be extended as shown in FIGS. 21A-1 to 21E or otherwise (e.g. as shown in the other drawings) to form a hydraulic machine system with a wide range of functional variations not envisaged or allowed for in the prior art.

While certain modifications and variations have been described above, the invention is not restricted thereto and other modifications and variations can be adopted without departing from the scope and spirit of the invention as defined in the appended claims.

I claim:

1. A multi-functional rotary hydraulic machine comprising:
   (a) a static outer casing;
   (b) a prime mover comprising a stator assembly and a rotor assembly, said stator assembly being mounted within and encased by said static outer casing;
   (c) said rotor assembly comprising a pair of half-shafts by which said rotor assembly is rotatably mounted within said stator assembly;
   (d) said rotor assembly comprising mounting and coupling means by which a selected one of a plurality of mechanically interchangeable and hydraulically functionally different rotary hydraulic machine units is mounted within and coupled to said rotor assembly for rotation therewith.

2. A multi-functional rotary hydraulic machine system comprising:
   (a) a plurality of mechanically interchangeable and hydraulically functionally different rotary hydraulic machine units; and
   (b) a multi-functional rotary hydraulic machine, wherein said machines comprises:
      (i) a static outer casing;
      (ii) a prime mover comprising a stator assembly and a rotary assembly, said stator assembly being mounted within and encased by said static outer casing;
      (iii) said rotor assembly comprising a pair of half-shafts by which said rotor assembly is rotatably mounted within said stator assembly;
      (iv) said rotor assembly comprising mounting and coupling means by which a selected one of said plurality of different rotary hydraulic machine units is mounted within and coupled to said rotor assembly for rotation therewith.

3. A multi-functional rotary hydraulic machine as claimed in claim 1 wherein the prime mover is a motor functional operation of said prime mover causing motoring of said rotor assembly.

4. A multi-functional rotary hydraulic machine as claimed in claim 1 wherein the prime mover is a generator induced rotation of the machine unit by hydraulic flow therethrough causing functional operation of the prime mover as a generator.

5. A multi-functional rotary hydraulic machine as claimed in claim 3 wherein said stator assembly comprises the stator of an electric motor and said rotor assembly comprises a brushless rotor of said electric motor.

6. A multi-functional rotary hydraulic machine as claimed in claim 5 wherein said motor is a squirrel-cage induction motor and said rotor is a brushless squirrel-cage rotor.

7. A multi-functional rotary hydraulic machine as claimed in claim 3 wherein said prime mover is a fluid motor.

8. A multi-functional rotary hydraulic machine as claimed in claim 3 wherein said prime mover is a Wankel-type internal combustion engine having a rotary piston, said rotor assembly comprising said rotary piston.

9. A multi-functional rotary hydraulic machine system as claimed in claim 2 wherein said plurality of mechanically interchangeable and hydraulically functionally different rotary hydraulic machine units comprises at least one volumetric machine unit and at least one hydrokinetic machine unit.

10. A multi-functional rotary hydraulic machine system as claimed in claim 2 wherein said plurality of mechanically interchangeable and hydraulically functionally different rotary hydraulic machine units comprises at least one single-stage machine unit and at least one multi-stage machine unit.

11. A multi-functional rotary hydraulic machine as claimed in claim 1 wherein said selected one rotary hydraulic machine unit comprises a spiral array of volutes.

12. A multi-functional rotary hydraulic machine as claimed in claim 1 wherein said selected one rotary hydraulic machine unit comprises an array of spirally-pitched blades.

13. A multi-functional rotary hydraulic machine as claimed in claim 12 wherein said array of spirally-pitched blades forms a propellor structure.

14. A multi-functional rotary hydraulic machine as claimed in claim 12 wherein said array of spirally-pitched blades forms an Archimedean-screw.

15. A multi-functional rotary hydraulic machine as claimed in claim 1 wherein said selected one rotary hydraulic machine unit comprises at least one radial-outflow centrifugal impeller.

16. A multi-functional rotary hydraulic machine as claimed in claim 15 wherein said selected one rotary hydraulic machine unit comprises a plurality of radial-outflow centrifugal impellers arrayed in pressure-compounding cascade.

17. A multi-functional rotary hydraulic machine as claimed in claim 1 wherein said selected one rotary hydraulic machine unit comprises a volumetric hydraulic machine unit positively displacing hydraulic fluid in proportion to rotational movement of the rotor assembly.

18. A multi-functional rotary hydraulic machine as claimed in claim 17 wherein said volumetric hydraulic machine unit comprises at least two hydraulic rotor components each mounted for rotation about a respective rotational axis, the rotational axes of the rotor components being substantially parallel at a substantially fixed mutual displacement between each pair of rotational axes, the rotor components having regularly lobed peripheries, adjacent rotor components having their respective lobed peripheries intermeshed to form fluid-displacing cavities which move with rotation of said rotor components to positively displace hydraulic fluid through the hydraulic machine unit formed by the intermeshed rotor components.

19. A multi-functional rotary hydraulic machine as claimed in claim 18 comprising first and second hydraulic rotor components, said first rotor component being mounted within and coupled to said rotor assembly, said first rotor component being internally lobed with N lobes, said second rotor component being externally lobed with (N-1) lobes, said second rotor component being eccentrically mounted within the first rotor component such that the internal lobes on the first rotor component intermesh with the external lobes on the second rotor component.

20. A multi-functional rotary hydraulic machine as claimed in claim 19 wherein the lobes on each of said first and second rotor components are spirally developed in an axial direction such that the hydraulic machine unit formed by the intermeshed rotor components is a Moineaux progressive cavity positive displacement pump in which the fluid-displacing cavities axially progress through the Moineaux pump with rotation of the rotor assembly of said hydraulic machine.

* * * * *